United States Patent
Qiao et al.

(10) Patent No.: US 11,337,134 B2
(45) Date of Patent: May 17, 2022

(54) DATA FORWARDING METHOD AND APPARATUS

(71) Applicant: Nanjing Silergy Micro Technology Co., Ltd., Nanjing (CN)

(72) Inventors: Junjie Qiao, Nanjing (CN); Zhongjie Sun, Nanjing (CN)

(73) Assignee: Nanjing Silergy Micro Technology Co., Ltd., Nanjing (CN)

( * ) Notice: Subject to any disclaimer, the term of this patent is extended or adjusted under 35 U.S.C. 154(b) by 0 days.

(21) Appl. No.: 16/862,789

(22) Filed: Apr. 30, 2020

(65) Prior Publication Data

US 2020/0351751 A1 Nov. 5, 2020

(30) Foreign Application Priority Data

May 5, 2019 (CN) .......................... 201910366690.5

(51) Int. Cl.
*H04W 40/22* (2009.01)
*H04W 72/04* (2009.01)
*H04W 4/06* (2009.01)
*H04W 84/18* (2009.01)

(52) U.S. Cl.
CPC ............. *H04W 40/22* (2013.01); *H04W 4/06* (2013.01); *H04W 72/04* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 6,496,478 B1 | 12/2002 | Choi et al. | |
| 8,040,857 B2 * | 10/2011 | Wang | H04L 1/20 370/337 |
| 10,462,044 B2 | 10/2019 | Qiao | |
| 2004/0174884 A1 * | 9/2004 | Wright | H04L 12/4641 370/395.41 |
| 2005/0208949 A1 * | 9/2005 | Chiueh | H04W 40/02 455/452.2 |
| 2006/0268823 A1 * | 11/2006 | Kim | H04W 72/005 370/349 |
| 2007/0202878 A1 | 8/2007 | Choi et al. | |
| 2008/0175193 A1 * | 7/2008 | So | H04W 72/04 370/329 |
| 2008/0253386 A1 | 10/2008 | Barum | |
| 2013/0064159 A1 * | 3/2013 | Edwards | H04L 12/189 370/312 |

(Continued)

FOREIGN PATENT DOCUMENTS

| | | |
|---|---|---|
| CN | 102118826 A | 7/2011 |
| CN | 103200689 A | 7/2013 |

(Continued)

*Primary Examiner* — Kenny S Lin (57) ABSTRACT

A method of data forwarding in a mesh network includes: layering a plurality of nodes in the mesh network, where the mesh network includes the plurality of nodes and at least one of the plurality of nodes is used as a relay node to forward a data packet from a source node to a destination node; allocating forwarding channels to lower nodes by upper nodes; and transmitting the data packet from the source node to the destination node through at least one relay node via the forwarding channel corresponding to the destination node, where each of the plurality of nodes has one corresponding forwarding channel.

20 Claims, 5 Drawing Sheets

(56) References Cited

U.S. PATENT DOCUMENTS

| | | |
|---|---|---|
| 2017/0019828 A1 | 1/2017 | Purohit |
| 2017/0201854 A1* | 7/2017 | Choi ................. H04W 72/0406 |
| 2017/0214604 A1 | 7/2017 | Qiao |
| 2018/0176851 A1* | 6/2018 | Lim ...................... H04W 68/00 |
| 2019/0037419 A1* | 1/2019 | Knaappila ......... H04W 52/0212 |
| 2019/0223029 A1* | 7/2019 | Clarke .............. H04W 72/0453 |
| 2020/0068527 A1 | 2/2020 | Gong |

FOREIGN PATENT DOCUMENTS

| | | |
|---|---|---|
| CN | 105119785 A | 12/2015 |
| CN | 108777844 A | 11/2018 |
| WO | 2004/004230 A1 | 1/2004 |
| WO | 2005/067123 A1 | 7/2005 |

\* cited by examiner

DATA FORWARDING METHOD AND APPARATUS

RELATED APPLICATIONS

This application claims the benefit of Chinese Patent Application No. 201910366690.5, filed on May 5, 2019, which is incorporated herein by reference in its entirety.

FIELD OF THE INVENTION

The present invention generally relates to the field of data communication technology, and more particularly to data forwarding methods and apparatuses.

BACKGROUND

With the development of Internet of Things (JOT) technology, more and more smart devices are connected to the network. Mesh networks have attracted much attention because of suitability for covering large open areas. A mesh network is a network architecture that includes a plurality of nodes, whereby at least one node serves as a network controller. The network controller can be used for communication scheduling between nodes, and communication routing between nodes and external networks. The nodes can access external networks via the network controller, whereby usually only one network controller controls the network.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
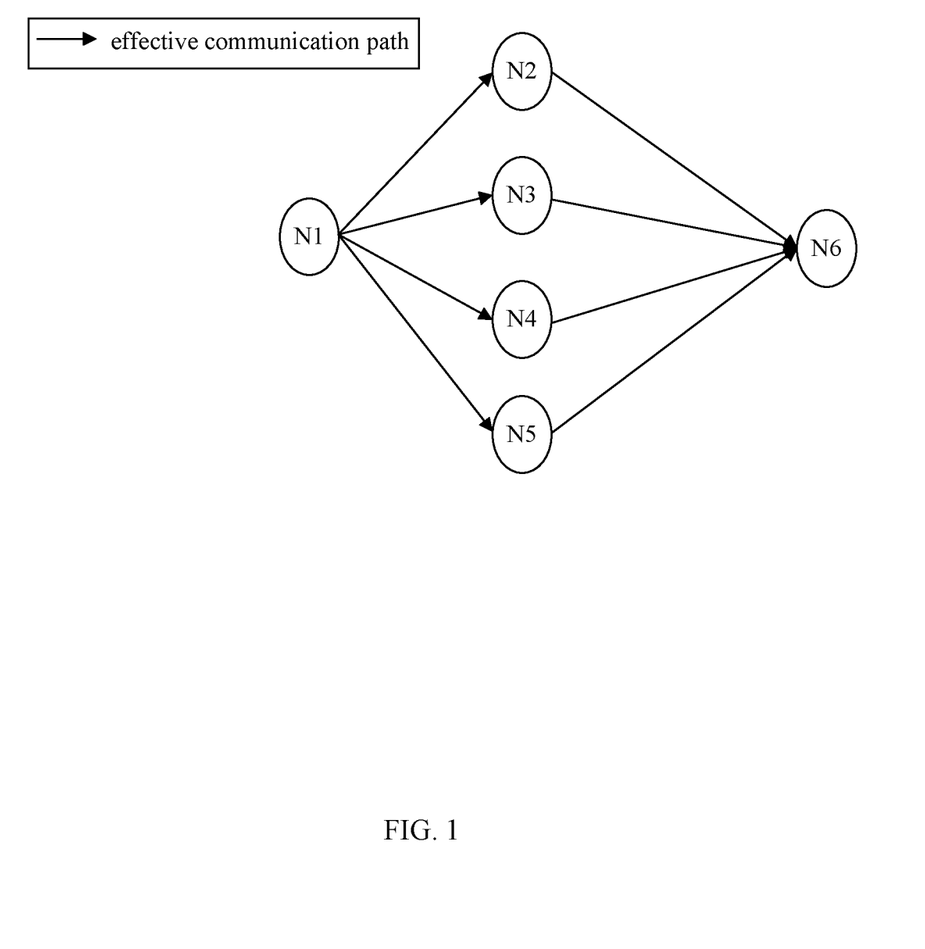
FIG. 1 is a schematic block diagram of an example mesh network.

Referring now to FIG. 1, shown is a schematic block diagram of an example mesh network. When node N1 sends a data packet to node N6, node N1 first sends the data packet to nodes N2-N5 by broadcasting. After receiving the data packet, nodes N2-N5 can perform a forwarding mechanism to respectively forward the data packet to node N6. In this example, node N1 is the source node, nodes N2-N5 are relay nodes, and node N6 is the destination node. After node N6 receives any data packet forwarded by nodes N2-N5, the task of transmitting data from node N1 to node N6 in the mesh network ends. However, nodes N2-N5 receive the data packets from node N1 almost at the same time in this case, and nodes N2-N5 forward the data packets at the same time, such that the data packet received by node N6 may be interfered by signals from the data packets forwarded by other nodes. This can may further cause an increase in the error rate of the data received by node N6.

Figure 2:
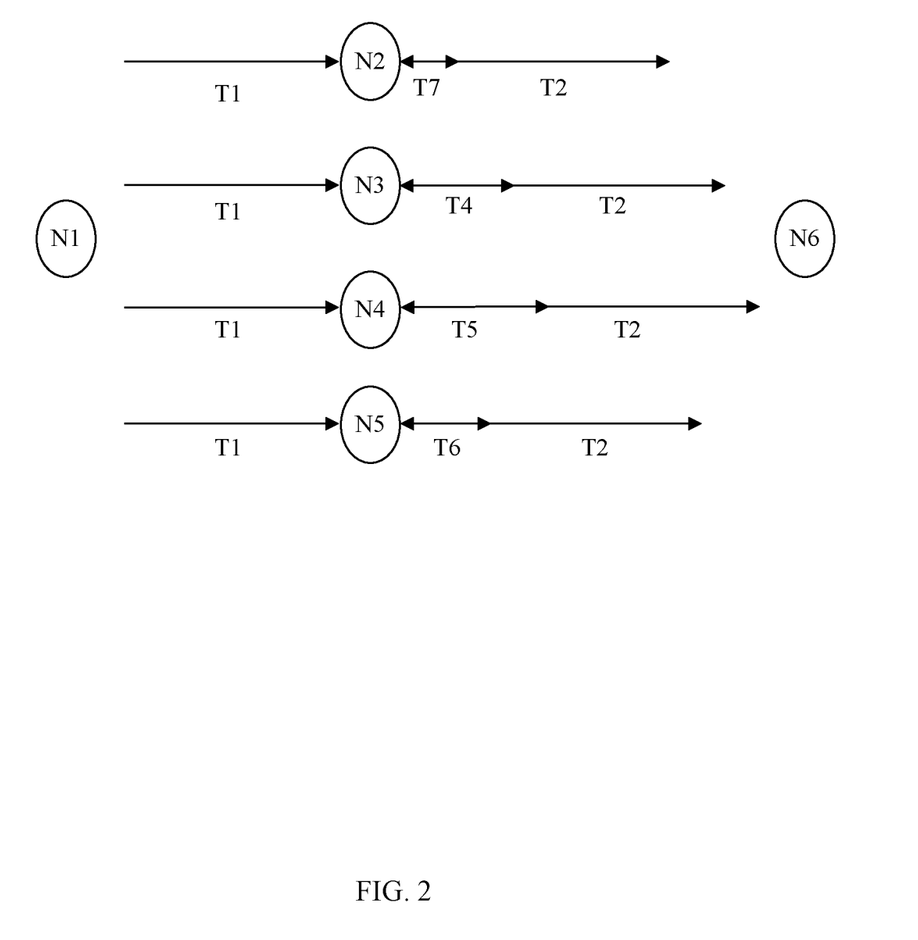
FIG. 2 is a timing diagram of an example process of data forwarding in the example mesh network.

Referring now to FIG. 2, shown is a timing diagram of an example process of data forwarding in the example mesh network. In order not to make the data packets forwarded by relay nodes N2-N5 reach destination node N6 at the same time, different random delays T4-T7 may be generated when relay nodes N2-N5 respectively receive the data packets sent by source node N1, such that the arrival times of the data packets forwarded by relay nodes N2-N5 to destination node N6 are different. However, random delays may be introduced when the relay nodes forward data, such that the time for the source node to transmit the data packet to the destination node is increased by an additional random delay to broadcast transmission times T1 and T2 between nodes. Thus, the data forwarding time of the entire network may be prolonged. When the number of nodes in the mesh network increases, the data forwarding time can also become longer.

In particular embodiments, data forwarding and the apparatus of the mesh network can be improved, in order to improve network communication efficiency, shorten communication time, and avoid collision of data packets during transmission. In the following description, specific details of certain embodiments are described, such as data structure, network protocol, network topology, network device hardware structure, etc., in order to better understand the present invention. However, it should be understood that by those skilled in the art that the present invention may be practiced without these specific details. In the following description, the terms "source node" and "destination node" may refer to devices that generate and expect to receive data packets, respectively, "source node" and "destination node" may be any of network controllers and node devices, and "relay node" may refer to node devices that forward data packets.

In one embodiment, a method of data forwarding in a mesh network can include: (i) layering a plurality of nodes in the mesh network, where the mesh network includes the plurality of nodes and at least one of the plurality of nodes is used as a relay node to forward a data packet from a source node to a destination node; (ii) allocating forwarding channels to lower nodes by upper nodes; and (iii) transmitting the data packet from the source node to the destination node through at least one relay node via the forwarding channel corresponding to the destination node, where each of the plurality of nodes has one corresponding forwarding channel.

Figure 3:
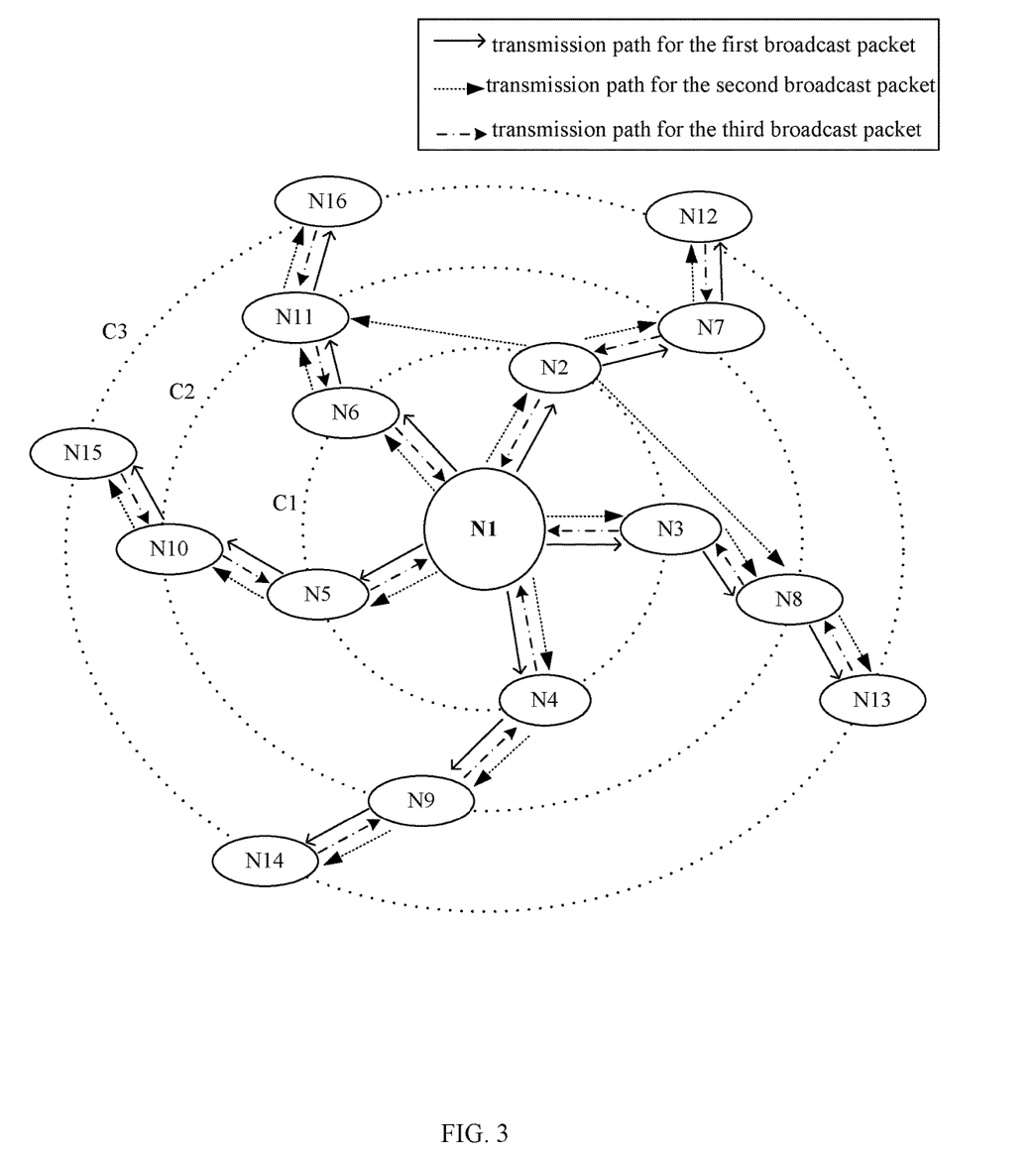
FIG. 3 is a schematic block diagram of an example mesh network during initialization, in accordance with embodiments of the present invention.

Referring now to FIG. 3, shown is a schematic block diagram of an example mesh network during initialization, in accordance with embodiments of the present invention. In this particular example, the mesh network can include nodes N1 to N16. For example, node N1 may serve as a network controller. For example, the network controller can be a smart terminal, such as a mobile phone or a computer, or a dedicated network controller. For example, the other nodes may serve as smart electronic devices, such as televisions, refrigerators, water heaters, LED lights, cameras, monitors, sockets, timers, etc., that have network connection functionality. The mesh network can be a single-path network, and may a plurality of signal paths centering on network controller N1. Each signal path can include a plurality of nodes coupled in series, and the plurality of nodes on different signal paths may not be coupled.

In some embodiments, the nodes between adjacent layers can establish effective communication paths for forwarding data packets. However, the specific implementation of allocating channels for the mesh network are not limited thereto, and for example, effective communication paths may also be established between nodes across layers. The mesh network may need a certain signal path in the data forwarding process. Therefore, during initialization, channels may need to be allocated to a plurality of nodes according to a preset protocol, such that the mesh network can provide a plurality of signal paths for data transmission in the initialization.

One example initialization process can include, in a first step, a plurality of nodes being layered according to the communication distance between the nodes. The mesh network may take network controller N1 as the center, and set other nodes into multiple layers according to the communication distance with network controller N1. In this example mesh network, nodes N2-N6 may be set as second-layer nodes, nodes N7-N11 can be set as third-layer nodes, and nodes N12-N16 may be set as fourth-layer nodes. Network controller N1 can be located at the upper layer of the second-layer nodes (e.g., the first layer of the network).

For example, network controller N1 in the mesh network, serving as the node at the upper layer above the other nodes, may send second broadcast packet RSSI_REQ to the other nodes in the network by broadcasting, in order to query the Received Signal Strength Indicator (RSSI) of the other nodes in the network. The payload value in second broadcast packet RSSI_REQ can include "RSSIREQ" in order to obtain relative position information between other nodes in the network and network controller N1. After receiving second broadcast packet RSSI_REQ sent by network controller N1, other nodes in the network can respectively send third broadcast packet RSSI_RSP to network controller N1 by broadcasting. The payload value in third broadcast packet RSSI_RSP can include the address of network controller N1 and the RSSI of the node itself. The RSSI of the node can characterize the communication distance relative to network controller N1. In addition, network controller N1 can receive third broadcast packet RSSI_RSP sent by other nodes, and may set the layer where the nodes around network controller N1 with the communication distance within the preset range are located as the second layer. For example, nodes N2-N6 can be the second-layer nodes. In the second step, the nodes at the upper layer may allocate forwarding channels to the nodes at the lower layer.

Network controller N1, which is the upper node, can send first broadcast packet RSSI_SET to second-layer nodes N2-N6. The payload value of first broadcast packet RSSI_SET can include the node address of second-layer nodes N2-N6 and the forwarding channels. The allocation principle of the forwarding channels can be that network controller N1, as the upper node of the second-layer nodes, randomly selects channels from N channels, and the channels selected after each selection are removed from the N channels, such that network controller N1 can select and allocate the forwarding channels for other second-layer nodes. Here, N is a positive integer and is related to the communication protocol adopted by the mesh network. For example, the mesh network can adopt the Bluetooth protocol 4.0; however, the mesh network can also communicate under the Bluetooth protocol 5.0, or any other suitable protocol. The forwarding channels allocated to the second-layer nodes by network controller N1 may be different than each other, such that network controller N1 can establish communication with up to N second-layer nodes and allocate forwarding channels thereto.

When second-layer nodes N2-N6 are allocated with the forwarding channels, the forwarding channels can be stored. After that, second-layer nodes N2-N6 can be used as upper nodes to repeat the first and second steps. Taking node N11 as an example, second-layer nodes N2-N6 may respectively send second broadcast packet RSSI_REQ to other nodes that are not layered by broadcasting (e.g., nodes N2-N6 all send second broadcast packet RSSI_REQ to node N11), whereas second broadcast packet RSSI_REQ sent by node N6 may be received by node N11 before other second-layer nodes. Thus, node N6 can establish interaction with node N11 and obtain channel allocation rights. Then, node N11 can send third broadcast packet RSSI_RSP to node N6. Accordingly, node N11, as a lower node of node N6, may be set as a third-layer node. That is, surrounding nodes that establish effective communication with the second-layer nodes may be set as third-layer nodes. In this example, the third-layer nodes can include nodes N7-N11.

The second-layer nodes may respectively send first broadcast packet RSSI_SET to the third-layer nodes with which communication is established, in order to allocate forwarding channels to third-layer nodes N7-N11, and then the forwarding channels of the third-layer nodes may be stored. In this particular example, one node may have at least one downlink channel (e.g., network controller N1 has five downlink channels). In addition, the forwarding channels of nodes at the same layer may belong to different frequency bands or the same frequency band. For example, since the channel of node N16 allocated by node N11 and the channel of node N15 allocated by node N10 may be the same channel or different channels, and the data packet may not be transmitted to node N15 and node N16 at the same time, even if the forwarding channels of node N15 and node N16 belong to the same frequency band, the bit error rate of the data may not increase due to the collision of the data packets in the channels with the same frequency band. Also, one lower node can establish effective interactive communication with one upper node, For example, the communication distance between the lower and upper nodes establishing communication can be less than the communication distance between the lower node and other upper nodes.

The Bluetooth protocols 4.0 and 5.0 can be used for interconnection between network controller N1 in the mesh network and the external network, and Bluetooth protocols 4.0 and 5.0 can be used for interconnection between network controller N1 and a plurality of nodes and among a plurality of nodes. In the example mesh network, network controller N1 may not only control the data communication within the mesh network, but can also provide a routing function for communication between the mesh network and the external network, such that a plurality of nodes in the mesh network can access the external network via network controller N1.

Figure 4:
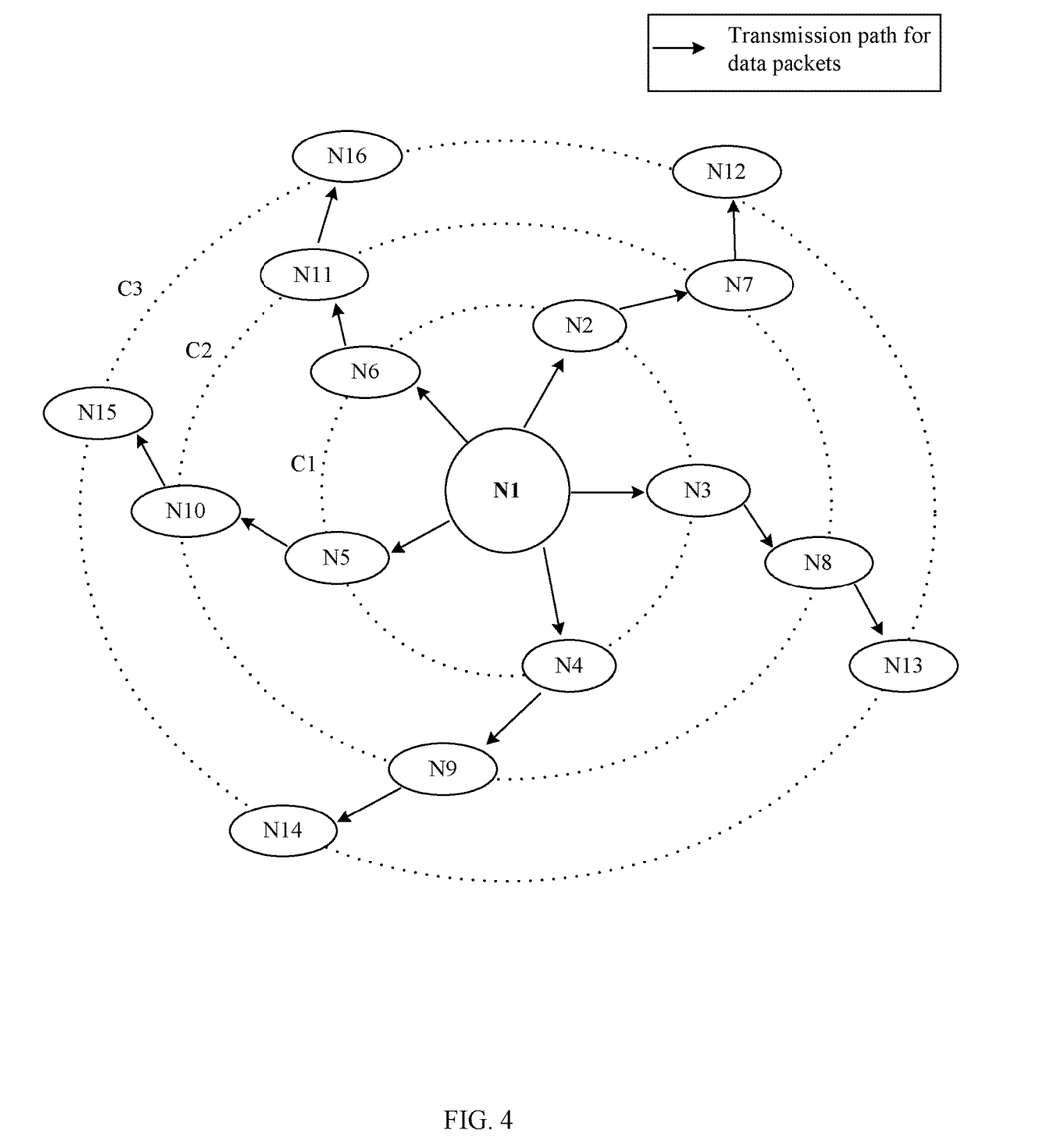
FIG. 4 is a schematic block diagram of an example data forwarding process of the mesh network, in accordance with embodiments of the present invention.

Referring now FIG. 4, shown is a schematic diagram of an example data forwarding process of the mesh network, in accordance with embodiments of the present invention. In this example, the mesh network can store a plurality of single-path transmission channels during initialization. Centering on network controller N1, nodes N6, N11, and N16 may sequentially be coupled in a first signal path, nodes N2, N7, and N12 may sequentially be coupled in a second signal path, nodes N3, N8 and N13 may sequentially be coupled in a third signal path, nodes N4, N9, and N14 may sequentially be coupled in a fourth signal path, and nodes N5, N10, and N15 may sequentially be coupled in a fifth signal path. The first to fifth signal paths can commonly be coupled to network controller N1, and signal nodes on different signal paths may not be coupled to each other.

For example, node N16 is taken as a destination node and network controller N1 is taken as a source node. The data packet generated by source node N1 can be transmitted from source node N1 to destination node N16 through the first signal path, and nodes N6 and N11 may act as relay nodes to forward the data packet. The forwarding channels of nodes N6, N11 and N16 can sequentially be coupled in series to form the first signal path. Also, the frequency bands of the forwarding channels of each node in the first signal path may be partially or completely the same or different from each other.

Figure 5:
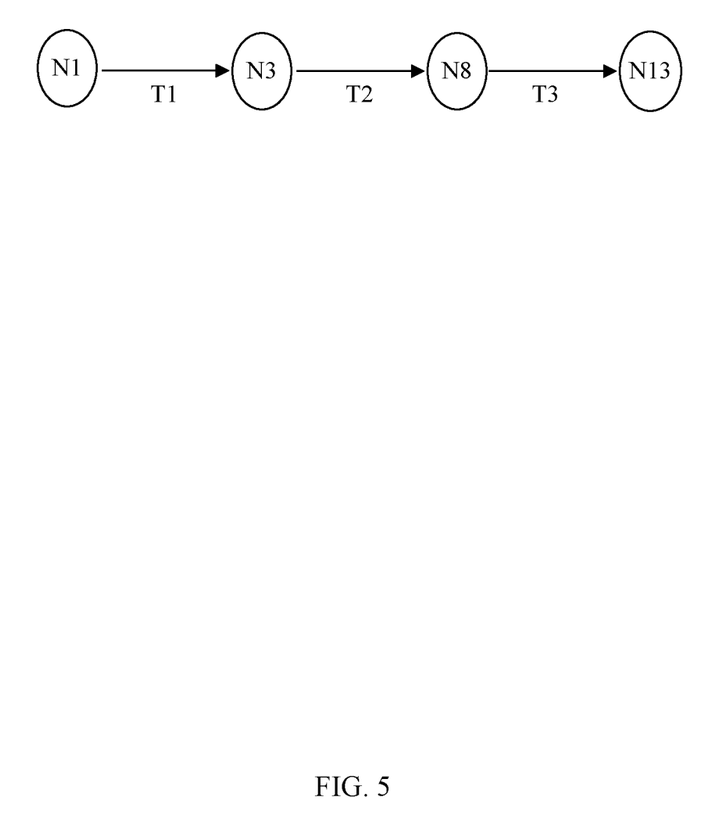
FIG. 5 is a timing diagram of an example data forwarding process of the mesh network, in accordance with embodiments of the present invention.

Referring now to FIG. 5, shown is a timing diagram of an example data forwarding process of the mesh network, in accordance with embodiments of the present invention. The principle of data forwarding of each node in the mesh network in this example is the same as discussed above; that is, data packets can be transmitted according to the stored signal paths. In this example, the data packet can be transmitted to relay node N3 by source node N1 after broadcast transmission time T1, the data packet may be forwarded to relay node N8 by relay node N3 after broadcast transmission time T2, and the data packet can be forwarded to destination node N13 by relay node N8 after broadcast transmission time T3. That is, the data packet may be transmitted through the signal path stored in the mesh network during initialization. Since the signal path has been determined during initialization, the data packet received by the destination node is forwarded through one signal path, and the data packet received by the destination node may not be collided by the data packets forwarded from other paths to the destination node. In addition, the data forwarding method applied herein may be based on frequency division multiplexing that does not need to add random delay in the broadcast forwarding process. In this way, the communication time of the mesh network can be reduced, and the communication efficiency of the mesh network can be improved.

In particular embodiments, an apparatus can be used to store forwarding channels of the nodes in the mesh network, to layer a plurality of nodes according to communication distances between the nodes, and to control upper nodes to allocate forwarding channels to lower nodes, as described herein. In certain embodiments, one node may have one forwarding channel.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method of data forwarding in a mesh network, the method comprising:
 a) layering a plurality of nodes in the mesh network, wherein the mesh network comprises the plurality of nodes and at least one of the plurality of nodes is used as a relay node to forward a data packet from a source node to a destination node;
 b) allocating, by randomly selecting from a plurality of channels, forwarding channels to lower nodes by different upper nodes that are in a same layer; and
 c) transmitting the data packet from the source node to the destination node through at least one relay node via the forwarding channel corresponding to the destination node, wherein each of the plurality of nodes has one corresponding forwarding channel, thereby forming a plurality of signal paths centering on the source node, wherein signal nodes on different of the plurality of signal paths are not coupled with each other.

2. The method of claim 1, wherein the allocating forwarding channels to the lower nodes by the upper nodes comprises:
 a) allocating forwarding channels to the plurality of lower nodes respectively by the plurality of upper nodes on the same layer; and
 b) establishing interactive communication with one of the upper nodes to be allocated a corresponding forwarding channel by one of the lower nodes.

3. The method of claim 2, wherein a communication distance between the lower node that establishes the interactive communication with the upper node and the upper node is less than a communication distance between the lower node and other upper nodes on the same layer.

4. The method of claim 2, further comprising sending a first broadcast packet to the lower nodes on the same layer by one of the upper nodes, wherein the first broadcast packet comprises a node address and a forwarding channel corresponding to the lower node.

5. The method of claim 1, wherein a plurality of forwarding channels allocated to the plurality of lower nodes on the same layer by one of the plurality of upper nodes are different.

6. The method of claim 1, wherein the plurality of nodes are layered in accordance with communication distance relative to the upper node.

7. The method of claim 6, wherein:
 a) at least one of the plurality of nodes is set as a network controller as a upper node to send a second broadcast packet to the other nodes; and
 b) the second broadcast packet is used to query received signal strength indicator (RSSI) of the other nodes.

8. The method of claim 7, wherein the plurality of nodes receiving the second broadcast packet respectively send a third broadcast packet to the network controller to feedback relative position information with the network controller.

9. The method of claim 8, wherein:
 a) the third broadcast packet comprises an address of the network controller and the RSSI of the nodes; and
 b) the communication distance between the nodes is obtained in accordance with the RSSI of the nodes.

10. The method of claim 9, wherein when the communication distance between the nodes and the upper node is within a preset range, the layer where the nodes are located is set as a next layer of the layer where the upper node is located.

11. The method of claim 10, wherein the nodes on the next layer are set as the upper nodes to send the second broadcast packet to the other nodes that are not layered.

12. The method of claim 1, wherein communication protocols adopted by the mesh network comprise Bluetooth protocols.

13. An apparatus, comprising:
a) a plurality of nodes layered in the mesh network, wherein the mesh network comprises the plurality of nodes and at least one of the plurality of nodes is used as a relay node to forward a data packet from a source node to a destination node;
b) the apparatus being configured to allocate, by randomly selecting from a plurality of channels, forwarding channels to lower nodes by different upper nodes that are in a same layer; and
c) the apparatus being configured to transmit the data packet from the source node to the destination node through at least one relay node via the forwarding channel corresponding to the destination node, wherein each of the plurality of nodes has one corresponding forwarding channel, thereby forming a plurality of signal paths centering on the source node, wherein signal nodes on different of the plurality of signal paths are not coupled with each other.

14. The apparatus of claim 13, being configured to store the forwarding channels allocated to the nodes during initialization of the mesh network.

15. The apparatus of claim 13, wherein the plurality of nodes are layered in accordance with communication distance relative to the upper node.

16. The apparatus of claim 13, being configured to control the plurality of upper nodes on the same layer to respectively allocate the forwarding channels to the plurality of lower nodes, and control one of the lower nodes to establish interactive communication with one of the upper nodes to be allocated a corresponding forwarding channel.

17. The apparatus of claim 16, wherein a communication distance between the lower node that establishes the communication with the upper node and the upper node is less than a communication distance between the lower node and other upper nodes.

18. The apparatus of claim 16, being configured to control one of the plurality of upper nodes to send a first broadcast packet to the plurality of lower nodes, wherein the first broadcast packet comprises a node address and a forwarding channel corresponding to the lower node.

19. The apparatus of claim 13, wherein the plurality of forwarding channels allocated to the plurality of lower nodes on the same layer by one of the plurality of upper nodes are different.

20. The apparatus of claim 13, being configured to support a network connection function, wherein communication protocols adopted by the mesh network comprise Bluetooth protocols.

* * * * *